(No Model.)

H. MOODY.
LAG IRON FOR HORSE POWERS.

No. 359,399. Patented Mar. 15, 1887.

Witnesses:

Inventor
Henry Moody
Per Attys:

UNITED STATES PATENT OFFICE.

HENRY MOODY, OF TERREBONNE, QUEBEC, CANADA.

LAG-IRON FOR HORSE-POWERS.

SPECIFICATION forming part of Letters Patent No. 359,399, dated March 15, 1887.

Application filed November 20, 1886. Serial No. 219,518. (No model.) Patented in Canada January 12, 1886, No. 23,151.

*To all whom it may concern:*

Be it known that I, HENRY MOODY, of the town of Terrebonne, in the county of Terrebonne and Province of Quebec, Canada, have invented certain new and useful Improvements in Lag-Irons for Horse-Powers; and I do hereby declare that the following is a full, clear, and exact description of the same.

The present construction of lag-irons for horse-powers and the way in which they are attached to the tread are open to the objections that the iron and the shoe are very liable to be broken by the horses' hoofs as soon as the tread becomes at all worn, and that the impact of the hoofs will soon loosen the connection of the treads with the lag-iron. To remedy these I substitute for the cap or shoe into which the end of the tread is inserted and secured, and to which the bent iron is attached, a stiff back piece carrying upon its upper surface the end of the tread, (to which it is attached at more than one point,) and having secured to its under surface the bent iron into which the pinion-wheel intermeshes.

Figure 1:
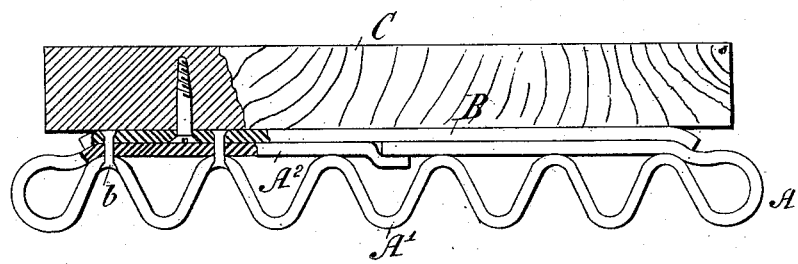
Figure 2:
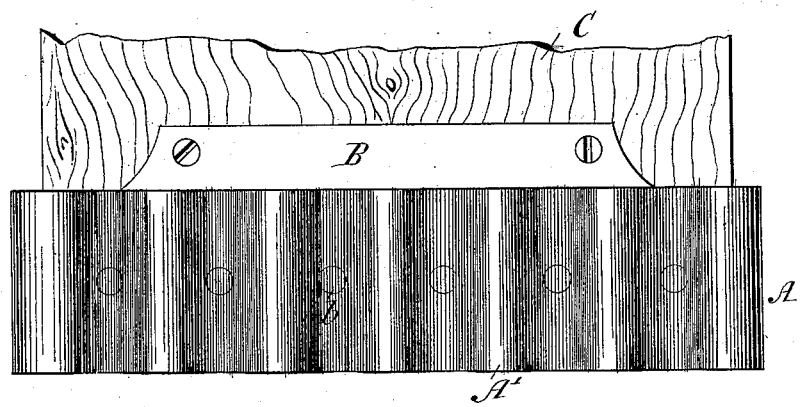

In the annexed drawings, forming part of this specification, Figure 1 is a side view, partly in section, of one iron with tread attached, and Fig. 2 a plan view of lag-iron, &c., looking up.

Similar letters of reference indicate like parts.

A is the lag-iron proper, A' showing the cogs or teeth into which it is bent, these, as usual, intermeshing with the pinion-wheel mounted on the shaft.

$A^2$ is the back plate overlapping at its junction.

B is the stiff back piece, preferably of steel, and wider than the lag-iron A, to which it is secured by bolts or rivets $b$, usually one to each cog.

The tread C rests upon the back piece, B, and is secured thereon by two or more bolts, rivets, or screws.

Having thus described my invention, I beg to state that what I claim is as follows:

In a horse-power, the combination, with the lag-wood or tread and corrugated lag-iron, of a plate or back piece of greater width than such corrugated portion secured to the under side of the tread by bolts or rivets passing through such extra width, and to the corrugated lag-iron by bolts or rivets between the cogs, all as herein set forth.

HENRY MOODY.

Witnesses:
C. S. WALLACE,
O. FORGET.